United States Patent [19]

Tachibana

[11] Patent Number: 4,950,899
[45] Date of Patent: Aug. 21, 1990

[54] POSITION DETECTING CIRCUIT WITH CCD AND RELATIVELY MOVING SOURCE

[75] Inventor: Miyuki Tachibana, Nagasaki, Japan
[73] Assignee: Mitsubishi Denki Kabushiki Kaisha, Tokyo, Japan
[21] Appl. No.: 307,915
[22] Filed: Feb. 9, 1989
[30] Foreign Application Priority Data
  Apr. 4, 1988 [JP] Japan .................................. 63-82676
[51] Int. Cl.⁵ ............................................. G01D 5/34
[52] U.S. Cl. ......................... 250/231.18; 250/211 K; 250/237 G
[58] Field of Search ........ 250/231 SE, 237 G, 211 K, 250/208, 209, 578

[56] References Cited

U.S. PATENT DOCUMENTS

| | | | |
|---|---|---|---|
| 4,100,420 | 7/1978 | Metcalf et al. | 250/237 G |
| 4,114,035 | 9/1978 | Herzog | 250/211 K |
| 4,384,204 | 5/1983 | Tamaki et al. | 250/231 SE |
| 4,668,862 | 5/1987 | Waibel | 250/237 G |
| 4,709,146 | 11/1987 | Reitsema | 250/237 G |
| 4,720,699 | 1/1988 | Smith | 250/231 SE |
| 4,799,798 | 1/1989 | Erb | 250/237 G |

FOREIGN PATENT DOCUMENTS 63-18172  4/1988  Japan .
63-133133 6/1988  Japan .

Primary Examiner—David C. Nelms
Attorney, Agent, or Firm—Burns, Doane, Swecker & Mathis

[57] ABSTRACT

A position detecting circuit for use in an apparatus for performing position control such as an original reading apparatus is disclosed. In the position detecting circuit according to the present invention, emitted light from a light emitting device is received by a CCD image sensor and a peak value of the output signal waveform of the CCD image sensor is detected. Then, the photosensing position of the CCD image sensor is identified according to the position of the peak value in the output signal waveform. The position of a moving member is determined by the photosensing position of the CCD image sensor, whereby the position detecting system is simplified in structure and enhanced in detecting accuracy.

4 Claims, 5 Drawing Sheets

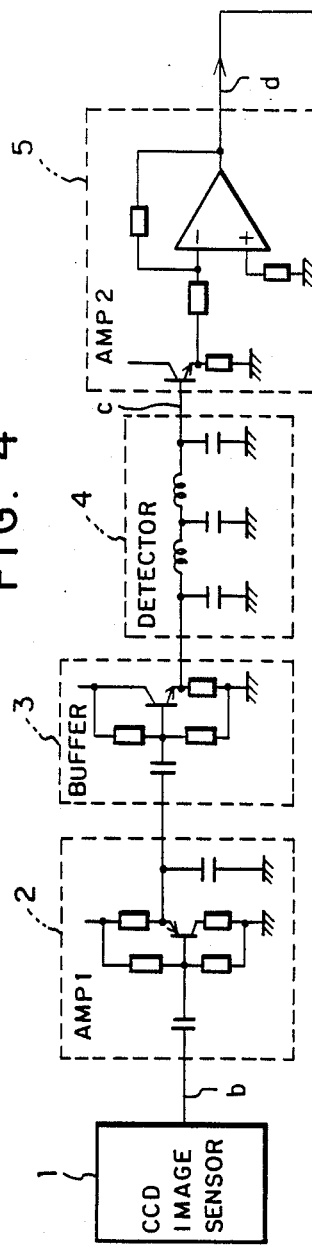
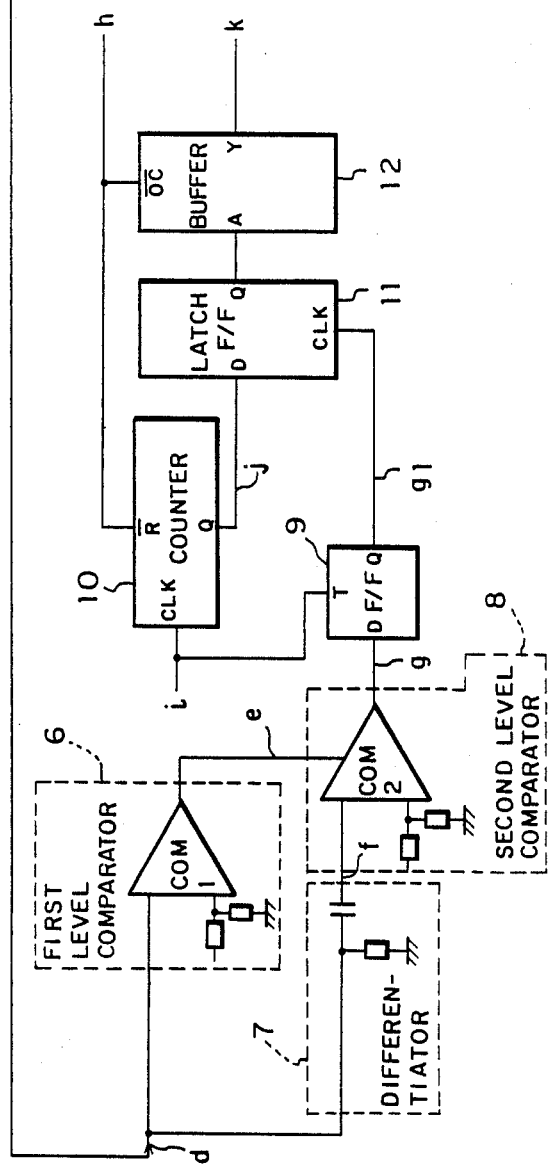
FIG. 4

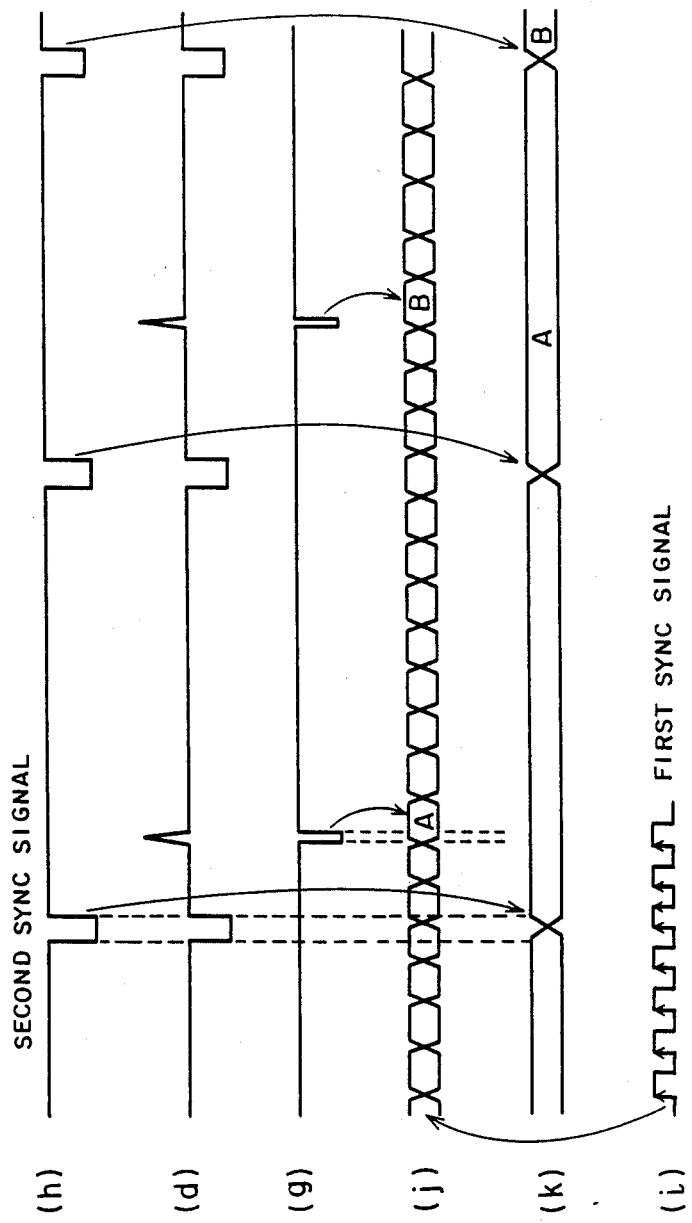

POSITION DETECTING CIRCUIT WITH CCD AND RELATIVELY MOVING SOURCE

BACKGROUND OF THE INVENTION

1. Field of the Invention

The present invention relates to a position detecting circuit for use in an apparatus performing position control for example an original reading apparatus.

2. Description of the Prior Art

FIG. 1 is a drawing for showing principle of detection performed in a prior art example of a position detecting system. Referring to the figure, reference numeral 18 denotes a light emitting device, 19 denotes a rotating member, 20 denotes a slit made in the rotating member, 21 denotes a photosensor device, and 22 denotes a counter.

Below will be described operation of the above mentioned arrangement. Light emitted from the light emitting device 18 is introduced through the slits 19 made in the rotating member 20 into the photosensor device 21 and thereby converted into an electric signal. The electric signal becoming a pulse signal is counted in number of pulses by the counter 22 and thereby the position of the rotating member is detected.

The detecting method in the prior art position control system has been of the type to pick up a signal carrying information about position and it therefore has had a mechanical arrangement in the detecting portion. Consequently, there have been such problems that the system requires complex and large size structure and its detecting accuracy is low.

SUMMARY OF THE INVENTION

The present invention was made to solve the above mentioned problems. Accordingly, an object of the present invention is to provide a position detecting circuit capable of directly detecting a current position of a moving member, simplifying the structure of the signal processing circuitry for detecting the position, and, further, capable of electric position detecting with high accuracy.

The position detecting circuit according to the present invention has a CCD image sensor attached to a fixed member and a light emitting device attached to a moving member for throwing light on the CCD image sensor to indicate the position of the moving member, and it is adapted such that a signal output from the CCD image sensor is led to signal processing.

The position detecting circuit according to the present invention processes a signal waveform output from the CCD image sensor because of the light received from the light emitting device being fixed to the moving member in motion and detects the portion of the image sensor at which the incoming light is strongest, and then reads out the address of the photosensing portion and thereby detects the current position of the moving member.

BRIEF DESCRIPTION OF THE DRAWINGS

FIG. 4 is a detailed circuit diagram for the block diagram of FIG. 2;

FIGS. 7(d), 7(g), 7(h), 7(i), 7(j) and 7(k) are timing charts showing operating principle of FIG. 4.

DETAILED DESCRIPTION OF THE PREFERRED EMBODIMENTS

Figure 1:
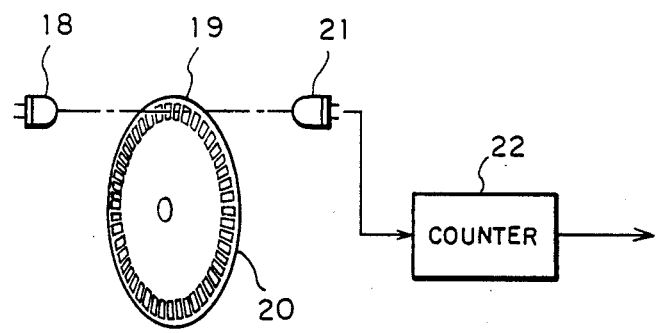
FIG. 1 is a block diagram showing an arrangement of a prior art position detecting circuit.
Figure 3:
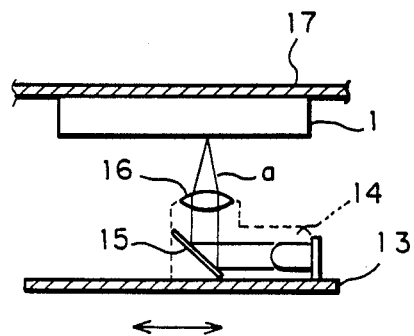
FIG. 3 is a drawing showing an arrangement of a detecting portion in an embodiment of the present invention.
Figure 2:
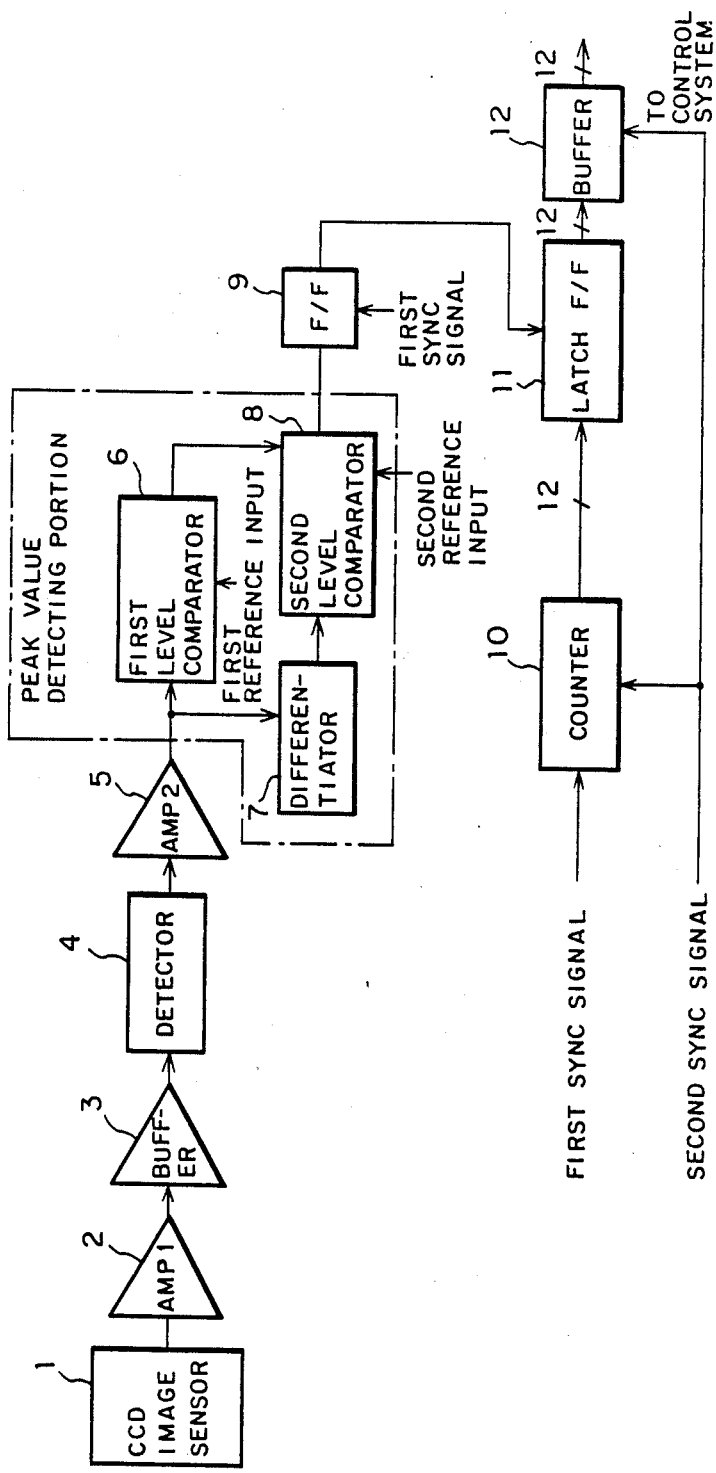
FIG. 2 is a block diagram showing an arrangement of the position detecting circuit according to an embodiment of the present invention.

An embodiment of the present invention will be described with reference to the accompanying drawings. Referring to FIG. 3, reference numeral 1 denotes a CCD image sensor attached to a fixed member 17, 13 denotes a moving member, 14, 15, and 16 denote a light emitting device, a reflecting mirror, and a condenser lens, respectively, attached to the moving member 13, and 17 denotes the fixed member. FIG. 2 is a block diagram showing an arrangement of the present invention, in which reference numeral 2 denotes an amplifier for amplifying a signal output from the CCD image sensor 1, 3 denotes a buffer supplied with an output signal of the amplifier 2, 4 denotes a detector such as a low-pass filter (L.P.F.) for obtaining an envelope on an output signal of the buffer 3, 5 denotes an inverting amplifier for amplifying an output signal of the detector 4, 6 denotes a first level comparator for comparing an output signal of the inverting amplifier 5 in voltage level with a first reference input, 7 denotes a differentiator for differentiating an output signal waveform of the inverting amplifier 5, 8 denotes a second level comparator for comparing an output signal of the differentiator 7 in voltage level with a second reference input, 9 denotes a flip-flop (hereinafter to be called "F/F") for synchronizing an output signal of the second level comparator 8 with a first sync signal, 10 denotes an address counter, 11 denotes a latch for receiving an address output from the address counter 10, and 12 denotes a buffer for receiving data output from the latch 11.

Figure 5B:
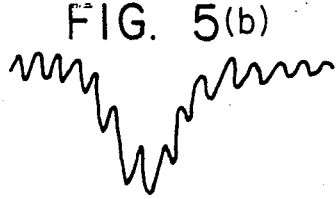
FIGS. 5(b), 5(c), 5(d), 5(e), 5(f) and 5(g) are diagrams showing partial waveforms of the waveforms obtained at outputs of each of circuits.
Figure 5C:
Figure 5D:
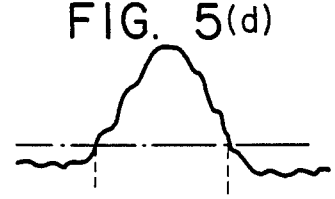
Figure 5E:
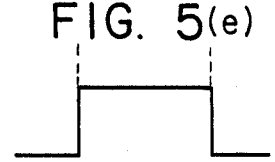
Figure 5F:
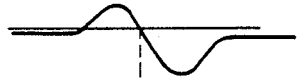
Figure 5G:
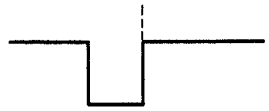
Figure 6:
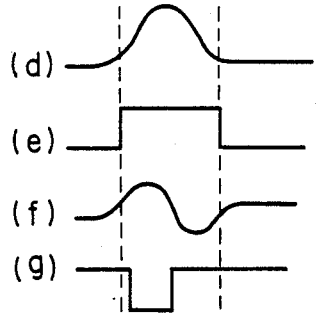
FIGS. 6(d), 6(e), 6(f) and 6(g) are diagrams showing waveforms at a peak value detecting portion.
Figure 8:
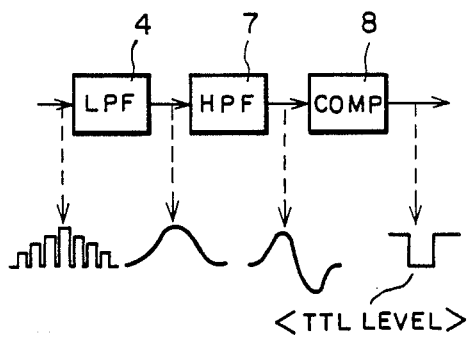
FIG. 8 is an explanatory drawing of operating principle of the peak value detecting portion.

FIG. 4 is a detailed circuit diagram for the block diagram of FIG. 2, FIG. 5(b) to FIG. 5(g) are diagrams showing partial waveforms of the waveforms obtained at outputs of each of circuits in FIG. 4, FIG. 6 is a diagram showing waveforms at a peak value detecting portion in FIG. 4, FIG. 7 is a timing chart showing operations of FIG. 4, and FIG. 8 is an explanatory drawing of operating principle of the peak value detecting portion.

Referring to the detecting portion with a structure as shown in FIG. 3, the light emitted from the light emitting device attached to the moving member 13 is reflected by the reflecting mirror 15 provided to save distance of the optical path, changed into a spotlight by being passed through the condenser lens 16, and thrown on the photosensing surface of the CCD image sensor 1.

The CCD image sensor 1 irradiated by the spotlight senses the light and outputs a video signal. In this video signal, a peak value appears at the portion corresponding to the photosensing portion. The video signal with the peak value is amplified in signal amplitude by the amplifier 2 and input to the detector 4 through the buffer 3. Since the detector 4 operates as a low-pass filter (L.P.F.), the high-frequency portion of the input signal is removed and thereby an envelope signal (c) is obtained. The signal (c) is amplified in amplitude by the amplifier 5 so that the signal processing in the later stages may be performed steadily and input to the peak value detecting portion. Here, the output (d) of the inverting amplifier 5 is first compared in voltage level with the first reference input by the first level comparator 6, whereby an output (e) at a TTL level having "H" value only at the portion of the signal (d) higher in voltage than the first reference input is obtained. On the other hand, the signal (d) input to the differentiator 7 is turned into a differentiated waveform (f) as shown in FIG. 5(f) and supplied to the subsequent second level comparator 8, and therein, compared in voltage level with the second reference input 2. Thereby, an output (g) at a TTL level having now "L" level only at the portion of the signal (f) higher in voltage than the second reference input is obtained. At this time, the output signal (e) of the first level comparator 6 serves as an output enable signal for the second level comparator 8, and therefore, the second level comparator 8 operates as the level comparator only while the signal (e) is "H" to provide the signal (g). The signal (g) is supplied to the subsequent F/F 9 and thereby synchronized with the first sync signal and input to the latch 11 as a latch signal.

Meanwhile, the address counter 10 is reset by the second sync signal and the counter is operated to count the first sync signal serving as the clock. Its output is supplied to the latch 11 as address data of 12 bits. Although the 12-bit address data are being always supplied to the latch 11, the instant the latch signal (g1) supplied from the F/F 9 becomes "L", the data are latched in the latch 11, and passed through the buffer 12 in the subsequent stage and output to the control system subsequent thereto at the timing of the second sync signal.

The 12-bit address data latched in the above described manner corresponds to the peak value of the video signal output from the CCD image sensor 1, i.e., the address of the photo sensing portion of the CCD image sensor 1, and the position on the moving member can thus be obtained by the 12-bit digital address data.

Although, in the above described embodiment, the CCD image sensor was attached to the fixed member and the light emitting device was attached to the moving member, the light emitting device may be attached to the fixed member and the CCD image sensor may be attached to the moving member. Also a circuit configuration in which operational amplifiers are used for the detector (L.P.F.) and the differentiator in the position detecting circuit may be practicable.

Further, the embodiment of this invention was described above as to its application to an image reading apparatus, but similar effects will be obtained if it is applied to a position detecting circuit in equipment requiring position control such as an apparatus in which-scanning with an electron beam is performed for detecting the current position. It is also possible to detect a quantity in a rotating motion as a change in position by converting the rotating motion into a straight-line motion mechanically or electrically. Although a CCD image sensor and a light emitting device were used in the detecting portion, similar effects will be obtained without using them but by the use of a device providing a detected signal with a peak value in combination with a peak value detecting portion. Further, it will be possible to arrange the address data to be provided in arbitrary number of bits.

What is claimed is:

1. In an apparatus performing position control, a position detecting circuit comprising a light emitting device attached to one of a moving member of the apparatus and a fixed member disposed to confront said moving member, a CCD image sensor in the form of a one-dimensional array attached to the other of said moving member and said fixed member, a signal processing circuit for processing a signal waveform output from said CCD image sensor, and a counter generating an address designating the current position of said moving member, wherein said signal processing circuit includes a low-pass filter for detecting the signal waveform output from said CCD image sensor and a peak value detecting circuit for detecting a peak value of the output of said low-pass filter, said peak value detecting circuit having a differentiator for differentiating the output of said low-pass filter, a first level comparator for outputting an enable signal when the output of said low-pass filter exceeds a first reference value, and a second level comparator for outputting a peak value signal when both the output of said differentiator exceeds a second reference value and said enable signal is output from said first level comparator.

2. A position detecting circuit according to claim 1, wherein said counter is operated to count in synchronism with a reading clock signal of said CCD image sensor and stops counting upon outputting of a peak value from said signal processing circuit.

3. A position detecting circuit according to claim 1, wherein said CCD image sensor is attached to said moving member and said light emitting device is attached to said fixed member.

4. A position detecting circuit according to claim 1, wherein said CCD image sensor is attached to said fixed member and said light emitting device is attached to said moving member.

* * * * *